(12) United States Patent
Gröppel et al.

(10) Patent No.: US 9,765,759 B2
(45) Date of Patent: Sep. 19, 2017

(54) SOLAR THERMAL POWER PLANT AND METHOD FOR OPERATING A SOLAR THERMAL POWER PLANT

(75) Inventors: Peter Gröppel, Erlangen (DE); Pascal Heilmann, Lauter (DE); Christian Müller-Elvers, Erlangen (DE); Peter Mürau, Fürth (DE); Matthias Übler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 248 days.

(21) Appl. No.: 14/113,055

(22) PCT Filed: Apr. 19, 2012

(86) PCT No.: PCT/EP2012/057132
§ 371 (c)(1),
(2), (4) Date: Oct. 21, 2013

(87) PCT Pub. No.: WO2012/143425
PCT Pub. Date: Oct. 26, 2012

(65) Prior Publication Data
US 2014/0033708 A1 Feb. 6, 2014

(30) Foreign Application Priority Data
Apr. 19, 2011 (DE) .......................... 10 2011 007 650

(51) Int. Cl.
*F03G 6/00* (2006.01)
*F01K 25/08* (2006.01)
(Continued)

(52) U.S. Cl.
CPC .............. *F03G 6/005* (2013.01); *F01K 13/02* (2013.01); *F01K 25/08* (2013.01); *F03G 6/065* (2013.01);
(Continued)

(58) Field of Classification Search
CPC ......... Y02E 10/46; Y02E 10/41; Y02E 10/44; Y02E 60/142; F01K 25/08; F01K 13/00;
(Continued)

(56) References Cited

U.S. PATENT DOCUMENTS 2,375,760 A 5/1945 Fahnestock
2,910,244 A * 10/1959 Payne .............................. 237/56
(Continued)

FOREIGN PATENT DOCUMENTS

CN 1230683 10/1999
CN 201650628 11/2010
(Continued)

OTHER PUBLICATIONS

English language copy of International Search Report for PCT/EP2012/057132, mailed Jul. 4, 2013, 3 pages.
(Continued)

*Primary Examiner* — Mark Laurenzi
*Assistant Examiner* — Wesley Harris
(74) *Attorney, Agent, or Firm* — Slayden Grubert Beard PLLC

(57) ABSTRACT

To operate solar thermal technology economically, a cheap heat transfer fluid is used. To either completely spare or significantly reduce the energy-intensive auxiliary heating at night, a water tank is simply installed in the plant without a threat to the environment. With the water tank, the salt HTF is thinned by adding water when the solar heating is not in operation.

17 Claims, 4 Drawing Sheets

(51) Int. Cl.
*F03G 6/06* (2006.01)
*F22B 1/06* (2006.01)
*F22B 1/00* (2006.01)
*F01K 13/02* (2006.01)

(52) U.S. Cl.
CPC .............. *F03G 6/067* (2013.01); *F22B 1/006* (2013.01); *F22B 1/06* (2013.01); *Y02E 10/41* (2013.01); *Y02E 10/44* (2013.01); *Y02E 10/46* (2013.01); *Y02E 60/142* (2013.01)

(58) Field of Classification Search
CPC .......... F03G 6/067; F03G 6/065; F03G 6/005; F22B 1/006; F22B 1/06
USPC ... 60/641.2–641.15, 659, 682–684, 651, 671
See application file for complete search history.

(56) References Cited

U.S. PATENT DOCUMENTS

| | | | |
|---|---|---|---|
| 3,517,151 A | * | 6/1970 | Mekjean ............... F24H 7/0433 219/618 |
| 4,204,407 A | | 5/1980 | Smith |
| 5,417,052 A | * | 5/1995 | Bharathan et al. ............. 60/783 |
| 7,588,694 B1 | | 9/2009 | Bradshaw et al. |
| 2005/0126170 A1 | | 6/2005 | Litwin |
| 2008/0000231 A1 | | 1/2008 | Litwin et al. |
| 2010/0301062 A1 | * | 12/2010 | Litwin et al. ................. 220/734 |
| 2011/0146959 A1 | * | 6/2011 | Root ............................ 165/108 |

FOREIGN PATENT DOCUMENTS

| | | |
|---|---|---|
| DE | 102011007650.6 | 4/2011 |
| EP | 1930587 | 6/2008 |
| EP | 2058515 | 5/2009 |
| WO | 2010/076790 | 7/2010 |
| WO | PCT/EP2012/057132 | 4/2012 |

OTHER PUBLICATIONS

Chinese Office Action for related Chinese Patent Application No. 201280019175.6, issued Jul. 1, 2015, 18 pages.
English language International Search Report for PCT/EP2012/057132, dated Jul. 4, 2013, 3 pages.
English language translation of Written Opinion for PCT/EP2012/057132, downloaded from WIPO website Oct. 21, 2013, 7 pages.
German Office Action for German Priority Patent Application No. 10 2011 007 650.6, dated Jan. 3, 2012, 6 pages.

* cited by examiner

SOLAR THERMAL POWER PLANT AND METHOD FOR OPERATING A SOLAR THERMAL POWER PLANT

CROSS REFERENCE TO RELATED APPLICATIONS

This application is based on and hereby claims priority to International Application No. PCT/EP2012/057132 filed on Apr. 19, 2012 and German Application No. 10 2011 007 650.6 filed on Apr. 19, 2011, the contents of which are hereby incorporated by reference.

BACKGROUND

The invention relates to a solar thermal power station and a method of operating a solar thermal power station.

Among renewable forms of energy generation, the solar thermal power station concept is said to have the greatest potential to be able in the future to generate a large proportion of the worldwide demand for electric energy without producing emissions and at competitive production costs. Not least, the Desertec or DII GmbH project focuses on erecting solar fields having a size of many square kilometers on the North African continent and in the Middle East, which are to be operated by parabolic trough mirrors and/or Fresnel mirrors arranged in a cascade-like manner to generate solar thermal energy for Europe. In such plants, a heat transfer fluid circulates in special, kilometer-long absorber tubes which are heated to process temperatures of up to 600° C. by bundling/focusing of solar radiation by the mirror geometries mentioned. A steam-driven turbine is operated by a heat exchange process and electric energy is released. The heat transfer fluid ("HTF") which has been cooled thereby is available in a cyclic process for renewed heating by thermal energy. Every solar thermal plant therefore has two HTF tanks, one containing cooled HTF and one containing hot HTF.

The HTF has to meet demanding requirements since its property parameters such as melting point, heat capacity, thermal conductivity, viscosity and specific gravity dictate the final power generation costs and thus determine the competitiveness and cost parity compared to conventional energy generation.

The melting point of the HTF used is of particular importance. The heat transfer media used at present are organic or inorganic in nature. The first generation of the HTFs used for this purpose are organic heat transfer oils, with the best-known representative for solar thermal applications being a eutectic-melting mixture of 26.5% by weight of biphenyl and 73.5% by weight of diphenyl ether (e.g. Therminol® VP-1 from Solutia™) which solidifies at 12° C. However, owing to the organic nature of the molecules, such mixtures quickly generate vapor pressures of up to 15 bar at high temperatures, so that the maximum operating temperature of this mixture known as "VP-1" is limited to below 400° C. since above these process temperatures thermal degeneration of the organic structures also occurs.

Since efficiencies of power stations are known to increase overproportionally with the process temperature, the use of such organic HTFs stands in the way of economical, solar thermal energy generation in the very high $MW_e$ power range. In addition, such a preparation poses a risk to human beings, animals and nature in the event of a leakage.

For this reason, attention has for some decades focused on the use of inorganic salt eutectics having low melting points as heat transfer medium. The negligible vapor pressure of liquid salts or mixtures thereof, which allows virtually atmospheric-pressure operation in the absorber pipes, has been found to be particularly advantageous. Furthermore, salt melts have a thermal conductivity or specific heat capacity which is greater by a factor of from two to three and allows the solar energy which can be introduced per unit volume to be increased greatly relative to organic heat transfer oils. The best-known representative of an inorganic salt mixture used for this purpose is "solar salt", viz. a mixture of sodium nitrate (60% by weight) and potassium nitrate (40% by weight).

This nontoxic preparation which is a factor of four cheaper than heat transfer oil VP-1 has a solidus temperature of about 240° C. To reduce the melting point, ternarization of the mixture with calcium nitrate (solidus temperature of the eutectic: 133° C.) or additional quaternization with lithium nitrate (solidus temperature of the eutectic: 97° C.) is useful. However, the latter method in particular requires the use of the expensive lithium nitrate which is not adequately available globally in multiton quantities.

Since a melting point of less than 150° C. of the heat transfer medium used in solar thermal power stations is indispensable for economical operation, the interest in inorganic salt eutectics having solidus temperatures below 100° C. is very great since night operation per se does not generate any electricity. The measures for avoiding "freezing" of a salt mixture in the usually kilometer-long feed pipe systems and receiver systems during the night when the HTF is not heated by the sun are accordingly energy-consuming.

In general, the solar thermal power station is operated at night using external heating, with a not inconsiderable amount of the power generated during the day being consumed again so that the pipes do not burst as a result of the volume expansion of the solidifying salt and/or so that the plant does not have to be started up afresh in the morning.

SUMMARY

One potential object is to make the use of salt-containing HTFs in solar thermal power stations more economically viable by reducing or avoiding night-time heating in order to avoid freezing of the HTF.

The inventors propose a solar thermal power station having a water-free or water-containing salt as heat transfer fluid (HTF), which comprises at least the following modules:
  a first circuit containing HTF,
  a second circuit containing steam for driving generators,
  where the first circuit comprises at least
  a solar field comprising mirror geometries and conduits in which the HTF flows,
  where
  a first conduit for the heated HTF leads from the solar field to the heat exchanger,
  a second conduit for the cooled HTF leads from the heat exchanger to the solar field,
  comprises a conduit for introducing a diluent for the HTF and
  the two circuits are connected via the heat exchanger.

The inventors additionally propose a method of operating a solar thermal power station, wherein the temperature of the HTF in the piping system of the solar thermal power station is kept above its melting point by the melting point of the HTF being shifted to lower temperatures by addition of water when the temperature decreases.

In general, water or another highly polar fluid is used as diluent.

The addition of water to the HTF when the temperature in the conduits of the solar thermal power station decreases has two results: firstly, if present in the HTF system, energy of hydration is liberated so as to effect heating by the exothermic chemical process of formation of more stable products by attachment of water molecules in the crystal lattice and, secondly, the melting point of the salt or of the salt mixture is lowered quite simply by liquefaction.

In an advantageous embodiment, an optionally switchable "conduit" from upstream of the hot tank into a diluent tank is then introduced again before the solar field. This tank is, in a particularly preferred embodiment, preferably pressure-rated since water is introduced in defined amounts into this, after separation of the first circuit from the second circuit, known as the TES cycle, and pressure increases arise there and are, for example, countered by over-pressure valves and condensers. The water can be added continuously or all at once.

After circulation of the aqueous salt during the night (the salt tanks containing the water-free salt provide the energy), the heating-up phase occurs in the still separated first circuit which comprises the solar field. The heating-up phase brings about primarily a release of water. Several ways of releasing the water are available:

1. The water is separated off via a further "stripping tank" and the water-free salt is conveyed into the hot or cold salt tank since the salt tanks are advantageously operated under atmospheric pressure.

2. The aqueous HTF mixture goes into the "cold" salt tank which is equipped with an over-pressure valve and condenser; the alternative of the aqueous HTF mixture going into the hot tank, which is then likewise equipped with over-pressure valves and condenser, is also conceivable.

3. The phase is heated far above the melting point of the water-free salt isolated in the solar circuit and then suddenly expanded into one of the two salt tanks.

In a proposed solar power station, enrichment of the HTF with water takes place in the first circuit, which comprises the solar field, after the sun goes down or during a switch-off time and a separate removal of water is possible in the morning or during running-up of the plant before energy is introduced by solar radiation.

A substantial benefit is in drainage, first charging, emptying and handling of emergency situations where the sun no longer shines.

Maintenance of the liquid phase within the conduit and/or piping system of the plant, in particular the solar field which generally extends over a number of kilometers, is important for the economics and function of the entire plant.

For this reason, a supplementary heating facility is, in a further advantageous embodiment, connected to the conduits containing the HTF in the solar field. Despite the lowering of the melting point of the salt-containing HTF by addition of diluent, for example water, it can be necessary to provide the absorber tube system with additional "firing", i.e. external heating. These heating elements which can introduce heat into the piping system either thermally, inductively or in another way have hitherto served, according to the related art, to maintain the liquid, i.e. fluid or flowable, state of the salt-containing HTF circulating therein during the shutdown phase or during the night.

Maintenance of a safety margin of about 20° C. above the actual melting point of the HTF used is usually recommended. If this is not achieved by the addition of water, this supplementary heating facility is switched on either automatically or manually.

As "salt-containing HTF", it is possible to use, for example, all types of nitrate salts, eutectically melting mixtures and also noneutectic mixtures.

For example, the readily available Na/K—$NO_3$, which does not take up any water of crystallization (Tmax=600° C.), serves as HTF. However, other salts and in particular those having a lower melting point are naturally likewise well-suited. In particular, a salt which binds water of crystallization, for example Ca—Na—K—$NO_3$ (Tmax=500° C.), is most suitable.

In addition, there is a range of new ternary, quaternary and quinary salt eutectics and mixtures which can, as a result of a suitable choice of different salt components, have melting points down to 65° C. and are suitable for this application. However, these mixtures are very expensive to procure or often not obtainable at all in large tonnages of up to 35 000 metric tons or more (in the case of simultaneous use as HTF and as thermal store).

It is thus possible to use sensible or latent salts. In this context, sensible means that energy is stored steplessly in the liquid salt as a result of the temperature of the salt increasing. The converse of sensible is "latent": here, the transformation solid→liquid on melting of the salt requires energy which is stored, since the "latent enthalpy" is liberated again on solidification of these salts. In CSP plants, preference is given to using sensible stores since the same material should be present in the two circuits. For this reason, the quantities of salt required are tremendous: for example 35 000 metric tons for 125 MWe.

For the purposes of this discussion, salt mixtures are, for example, salts and/or salt mixtures/salt eutectics of alkali metal cations (i.e. the cations of lithium $Li^+$, sodium $Na^+$, potassium $K^+$, rubidium $Rb^+$ and cesium $Cs^+$) and/or alkaline earth metal cations (i.e. the cations of magnesium $Mg^{2+}$, calcium $Ca^{2+}$, strontium $Sr^{2+}$ and barium $Ba^{2+}$) with anions such as nitrates, (hydrogen)carbonates, fluorides, chlorides, (hydrogen)sulfates, bromides, iodides and/or hydroxides, either alone or in any mixing combination, which can be thermally dehydrated without decomposition.

These can, as a result of mixing in of liquid and/or gaseous diluents having temperatures from, for example, room temperature to, for example, 300° C., undergo a melting point reduction and/or dilution with a polar diluent without decomposition and reversibly virtually any number of times.

Apart from the abovementioned salts, a nitrate-containing mixture known from DE 10 2010 041460.3, which comprises components containing water of crystallization and can be dehydrated thermally without decomposition, can be used as HTF. Above a particular temperature, this mixture is present as liquid phase and on heating it releases the bound water of crystallization firstly with a delay and then continuously. If the release of water of crystallization largely coincides with the eutectic liquidus temperature of the mixture which is free of water of crystallization, a mixture which far below its actual liquidus temperature is partly liquid (i.e. with sediment) or completely liquid (i.e. constitutes a single phase) is obtained.

All salts mentioned can be present in water-containing form and can be used with any proportion of water in the empirical formula as HTF. For example, it is also possible for diluted salts, i.e. salts having an empirical formula cation(s)/anion(s) with x water molecules per molecule of salt, which do not form "genuine", i.e. known, hydrates but instead simply incorporate water in the crystal, to be employed here. The transition from a salt which is simply diluted with water or another polar solvent to a salt hydrate known from the literature is fluid and should for the present purposes not restrict the number of materials which can be used as HTF.

In the addition of water to an HTF which is a mixture which can be dehydrated thermally without decomposition, a defined amount of water as addition is useful. For this purpose, a salt mixture which is free of water of crystallization and can be utilized as heat transfer medium and storage medium and can reversibly bind and release water of crystallization is supplied continuously with water.

A melting point of the mixture which is reduced proportionally to the content of added water is thus established. Here, a defined quantity of energy is sometimes released (known as heat of hydration in the case of compounds which crystallize with water of crystallization) and part of this can be utilized to keep the conduits in the solar circuit at a desired temperature.

It is advantageously proposed that a conduit be connected from a water tank to the conduits in the solar field so that, for example, a continual addition of water, water mist and/or water vapor to the HTF is effected through this until the desired melting point has been set.

In principle, single-digit melting points, depending on the water content, can be achieved. As soon as heating of the HTF in the conduits of the solar field recommences, the water-containing salt mixture can be pumped into the hot or cold salt tank and gradually release the water again there.

Since temperatures of, for example, 250° C.-290° C. prevail in the second, "cold" tank for the cooled HTF, the thermal energy is sufficient for the added water of crystallization and/or excess water to be rapidly vaporized. For this purpose, for example, a vapor separator with condenser is provided above the first and/or second tank in addition to an over-pressure valve, so as to condense and store the water vapor given off at the moment of introduction into the water tank for the next addition cycle.

This is a rapid process since the HTF from the solar field occupies a very much smaller volume (3-5%) compared to the volume of the HTF admixed with water. For example, there are 700 metric tons of salt in the solar circuit compared to a further 34 700 metric tons for storage. The 700 metric tons of salt contain about 20-30% of water, i.e. the total water content is less than 1% of the mass of salt and this vaporizes quickly at from 250° C. to 290° C. in the large salt tank.

To avoid a possible temporary superatmospheric pressure, it is possible to use, as mentioned above, over-pressure valves, for example with vapor separation, condensation and reflux for pressure reduction.

The water can be introduced into the solar circuit via an intermediate, very much smaller filled HTF tank by pumping in, injection, dropwise addition, condensing in or in another way since the addition of water for the lowering of the melting point results in an increase in volume of the mixture which can thus be compensated. The dilution of the salt is thus effected by dropwise addition, spraying in, introduction of mist, introduction of a jet or in another way, for example in the temperature range 10-1000° C.

The HTF having a reduced melting point as a result of the addition of water has, owing to the high ion concentration, a very much lower vapor pressure than pure water. This is due to the attraction of the charged ions to the dipolar water. For this reason, it is possible to heat a water-containing salt melt far above 100° C. without excessive boiling of the bound/added water occurring. A far lower vapor pressure compared to pure water is established due to the interaction with the salt ions, so that the counterpressure developed by injection into the piping systems can be sufficient to keep this water-containing mixture liquid and in particular as a single phase. Modern plants which use, for instance, heat transfer oil as HTF are designed for pressures up to 35 bar.

A reduction in the melting point of the HTF mixture is achieved in the manner proposed here, so that no or very little supplementary heating is necessary in the kilometer-long piping systems. Freezing can likewise be prevented. Furthermore, rapid drainage of the heat transfer medium for maintenance work is possible. The first start-up of such a mixture as HTF is thus likewise easier without freezing phenomena (known as "freeze-ups") occurring. During daytime operation, the salt/water mixture can, after it has been heated up, be pumped into a "cold" and/or hot tank in order to free the mixture of the added water, which once again gives the water-free salt mixture which can be conveyed through the conduits into the solar field and there reheated to temperatures of up to 600° C. (e.g. in the case of nitrate mixtures of the first main group of the Periodic Table; other mixtures even higher).

Since the water-containing medium represents only a small fraction of the total volume of the medium used, continuous tapping of volatile water in the form of steam, e.g. via a gas-phase condenser, can be carried out at the elevated temperatures which always prevail in the storage tank. This water can serve either for steam generation for power generation or be stored in a reservoir for renewed introduction of water into the HTF. When salt components containing water of crystallization, e.g. calcium nitrate hydrate, are used, water is a constituent of a salt component and therefore does not have to be introduced from the outside at the beginning. Of course, the technique described can also be used for salt mixtures which do not form a salt hydrate, in particular the nitrate mixtures of the first main group of the Periodic Table, e.g. in particular the binary system Na—K—$NO_3$, in any mixture (eutectic and noneutectic). In this case, the addition of water represents an ordinary aqueous mixture.

Thus, high temperatures prevail in the storage tank even at night and ensure a liquid phase since only the decoupled first HTF circuit is diluted with water, while the water-free salt is stored undiluted in the tanks and generates energy throughout the night by being conveyed via the heat exchanger into the cold tank.

Dilution of the HTF, which itself can be present as water-containing salt, overnight or in the rest state of the solar field allows the utilization of cheap salt mixtures in solar thermal power stations in the temperature range from a few degrees Celsius up to 600° C.

Whereas calcium nitrate-containing mixtures known to those skilled in the art, e.g. the eutectically melting mixture of Ca—Na—K—$NO_3$, have a melting point of about 133° C., the use of this mixture is restricted to working temperatures below 500° C. since decomposition into oxides, i.e. calcium oxide, otherwise occurs. The decomposition leads to a shift in the melting point in the direction of higher temperatures and to occurrence of insoluble sediment which has a severely corrosive effect on the entire solar thermal power station.

Eutectically melting mixtures of lithium nitrate, potassium nitrate and sodium nitrate known to those skilled in the art melt at 120° C., but are very expensive. The technique described here makes it possible to use mixtures of sodium nitrate and potassium nitrate which in the absence of water melt only at temperatures above 223° C. but owing to the technique described here can be given any melting points below this. At the same time, the maximum working temperature of calcium nitrate-free mixtures is about 600° C. Such a mixture, e.g. the eutectic Na—K—NO$_3$ mixture "solar salt" (60% by weight of NaNO$_3$, 40% by weight of KNO$_3$) or any other mixture, can thus be used as heat transfer medium (HTF) and also as thermal storage material (TES). Moreover, the addition of water to the solar circuit results in a greatly reduced vapor pressure in the mixture. For this reason, the pressure design of the solar circuit, which is usually certified for up to 30 bar, can be used without design changes.

Thus, in the case of Na/K—NO$_3$, the water-containing, decoupled solar circuit can, for example, be heated to substantially above 223° C. in the morning and then be depressurized suddenly into an empty salt tank. Since the vapor pressure of the water naturally increases up to 300° C., the piping system is designed for this loading. At the moment of depressurization to 1 bar in the salt tank, the water vaporizes suddenly and can be stored.

Since the thermodynamic parameters and corrosion properties of the nitrate mixtures have been studied well, recourse can, in particular, be made to these mixtures as HTF medium even though they are per se unusable as heat transfer medium (HTF) for salt-operated solar thermal power stations because of their high melting point.

For example, the presence of water can lead to corrosion phenomena in pipes in nitrate-containing systems. For this reason, steels which are known from the literature to be compatible with aqueous salts and/or salt hydrates of the nitrate type should be used. For this purpose, stainless steels, e.g. carbon-containing steels having carbon contents of greater than 0.20%, have been found to be most useful. Representatives of further steels are those having the German material numbers, for example, 1.4301, 1.4305, 1.4306, 1.4307, 1.4401, 1.4404, 1.4435, 1.4539, 1.4541, 1.4550, 1.4571; the US pendants of the grades 304, 303, 304L, 316, 316L, 904L, 321, 316Ti are complementary thereto. Pretreatment with corrosion inhibitors is useful for further reducing the corrosion behavior of such steels in aqueous salt mixtures. The one-off or continuous flushing of the interior walls of the stainless steel tubes with a phosphate (derivative) solution (e.g. sodium hydrogenphosphate, sodium dihydrogenphosphate, sodium polyphosphate) having a concentration of 1-100 mmol/l is found to be particularly advantageous.

In the nitrate systems it is known that the nitrite inevitably formed from the nitrate ions by thermal degradation has a corrosion-inhibiting effect. In this case, the treatment with water leads to rapid distribution of the nitrite within the piping system.

In an advantageous embodiment of the power station, a plant for generating power is connected to the heat exchanger.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
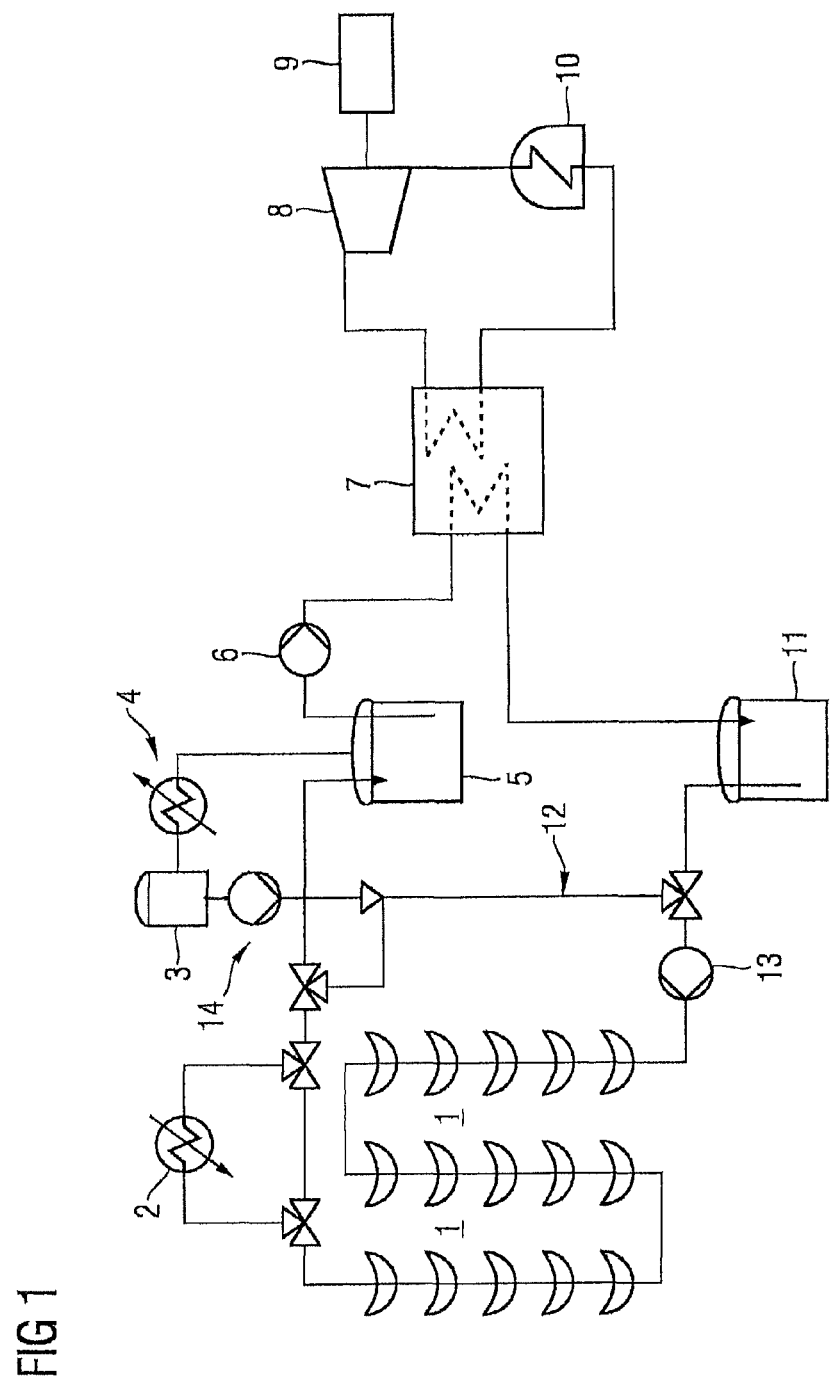
FIG. 1 shows a schematic depiction of a solar thermal power station with direct introduction of the diluent into the conduit to the solar field.

Reference will now be made in detail to the preferred embodiments of the present invention, examples of which are illustrated in the accompanying drawings, wherein like reference numerals refer to like elements throughout.

FIG. 1 shows a flow diagram having the first circuit, a solar field 1, an optional additional firing/accompanying heating facility 2, a tank for addition of water 3, a vapor condenser 4, for example with upstream vapor separator, a first tank 5 which serves as hot salt melt store, a pump 6 for hot salt melt, as connection to the second circuit of a heat exchanger unit 7 and/or a steam generator system via which the two circuits are connected, a turbine 8 of the second circuit, with generator 9 and cooling 10. From the heat exchanger 7 back to the solar field 1, the conduit goes via the "cold" tank 11, viz. the cold melt store having temperatures of, for example, from 250° C. to 290° C. In the example shown here, the conduit 12 for introduction of the diluent leads into this cold tank. The pump for cold salt melt 13 which sends the salt melt back to the solar field 1 can also be seen. During the night, the salt melt leaving the solar field 1 is, according to this example, conveyed via the conduit 12 into the tank 11 where it is diluted with water.

During the daytime phase, the conduit 12 is not opened. The energy from the sun heats the water-free HTF, for example a salt medium in the tank(s) 5 and 11, by the mirror geometries of the solar field 1 and generates steam via the heat exchanger unit 7 which produces electricity by turbine 8 and a generator 9. Water vapor is recondensed to form liquid water by cooling unit 10. When the sun goes down or during maintenance work/drainage activity, etc., the conduit 12 is opened and liquid and/or gaseous water is introduced continuously or discontinuously via the water reservoir 3 and the water pump 14 to a salt dilution process. This forms a low-melting salt mixture which is circulated in a manner decoupled from the steam generation process. Energy generation is then effected just by emptying the thermal reservoir 5 via pump 6 and heat exchanger 7 into the cold salt tank 11. When, for example, the sun comes up, the water-containing heat transfer medium is pumped in the decoupled solar field circuit 1→12→13 into the emptied hot salt tank 5, whereupon rapid vaporization of the water present occurs. The conduit 12 is closed for this purpose. The vaporizing water is condensed by the vapor phase condenser (coupled to a vapor separator) 4 and stored in the water tank 3 for the next feed cycle. The increase in the volume caused by addition of water has to be appropriately regulated.

The heat exchanger unit 7 is, for example, the combination of economizer, vaporizer, superheater and/or reheater which is known to those skilled in the art.

Figure 2:
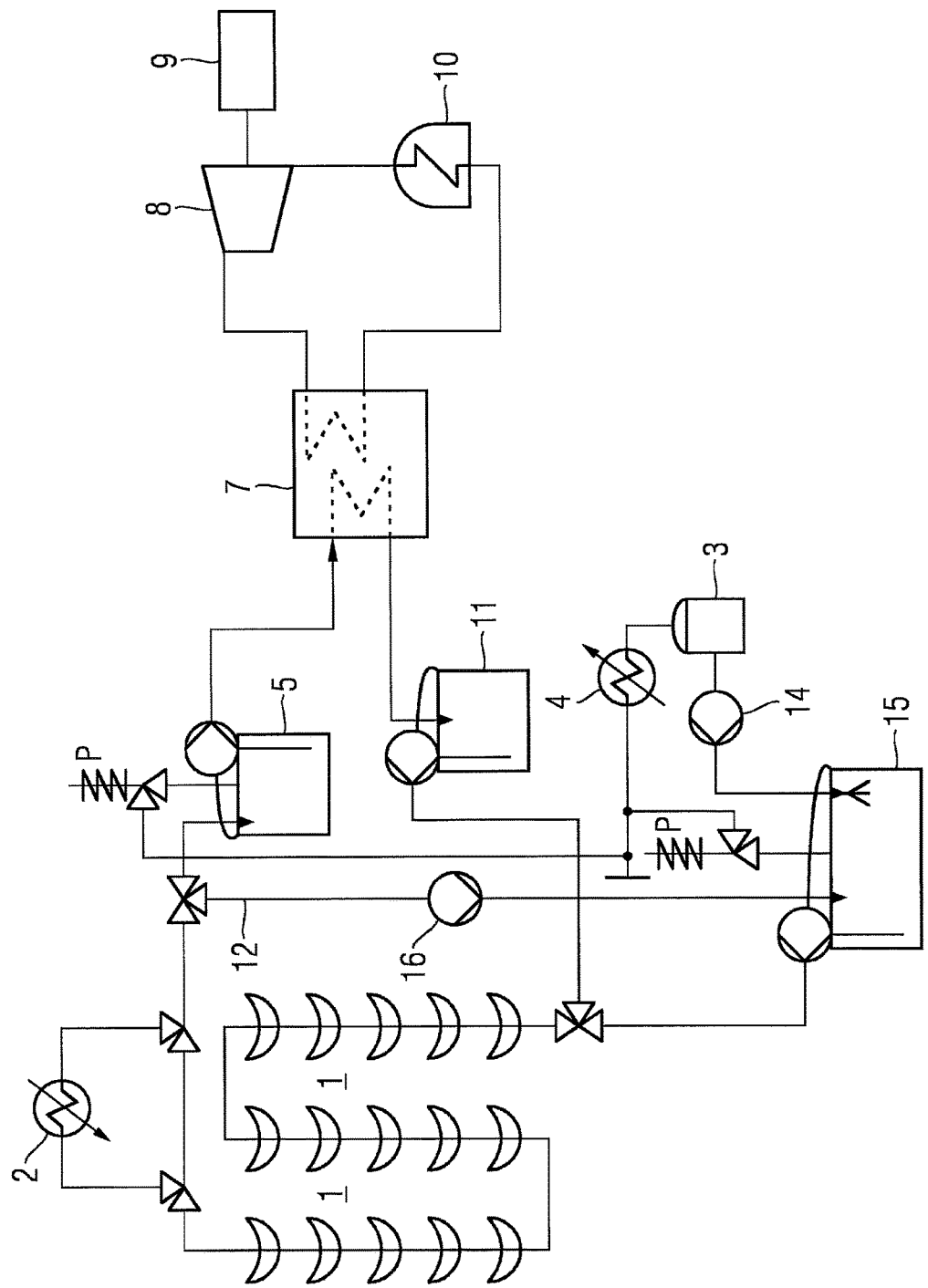
FIG. 2 shows the introduction of diluent into the second tank containing cooled HTF.

FIG. 2 again shows a similar flow diagram but with the additional components "15" intermediate/dilution tank for treatment of water, having a pump and water introduction unit (sprayer, mister, injector, etc.).

During the daytime phase, 12 is not opened. The energy from the sun heats the water-free salt medium in the salt tanks 5 and 11 by the mirror geometries of the solar field 1 and generates steam via the heat exchanger unit 7, which generates electricity by the steam circuit 7→8/9→10. When the sun goes down or during maintenance work/drainage, the conduit 12 is opened and liquid, gaseous or sprayed water is continuously introduced via the water reservoir 3 and the pump 14 into the dilution tank 15. This forms a low-melting salt mixture which is, for example during nighttime operation, circulated in a decoupled manner via 1→12→15. Since a reduced flow velocity can be desirable, a (circulation) pump 16 is employed within the decoupled circuit. To avoid (over-)pressure peaks during the introduction of water into 15, an over-pressure valve 17 can serve for depressurization. Energy generation is effected, decoupled by bypass 12, via emptying of the thermal reservoir 5 via heat exchanger unit 7 into the cold salt tank 11. When the sun comes up, the water-containing heat transfer medium is pumped into the hot tank, whereupon rapid vaporization of the water occurs. To avoid pressure conditions in the storage tank 5, an over-pressure valve 17 can be employed. Bypass 12 is closed for this purpose. The vaporized water is condensed by the vapor-phase condenser (coupled with a vapor separator) 4 and stored in the water tank 3 for the next feed cycle. Storage tank 15 can be prefilled with salt melt and/or water-diluted salt melt.

Figure 3:
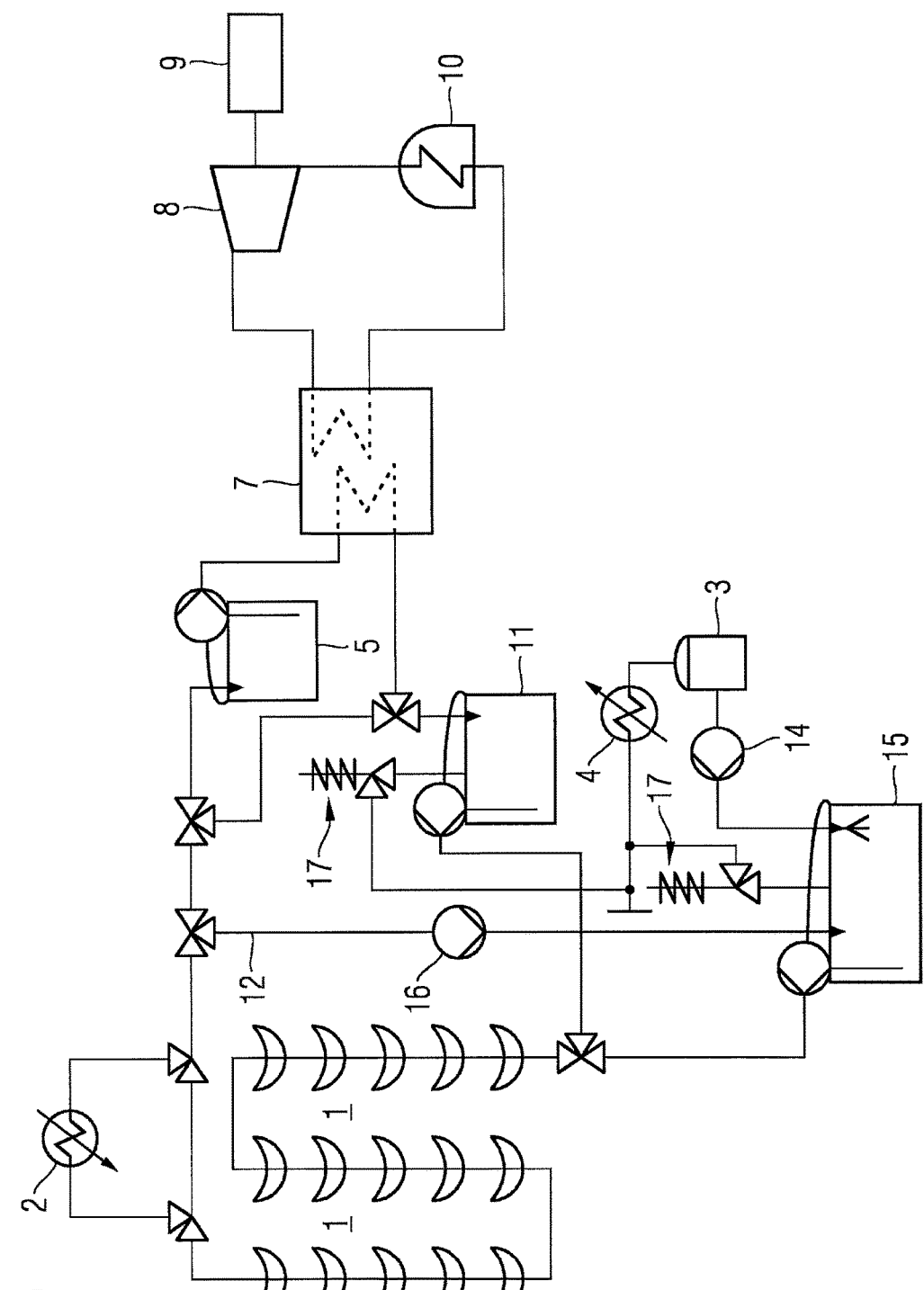
FIG. 3 shows an embodiment having an intermediate tank in the feed line for the HTF to the solar field and FIG. 4 shows an embodiment having an intermediate tank in the discharge line for the HTF from the solar field to the first tank containing heated HTF.

FIG. 3 shows a flow diagram of an embodiment with intermediate tanks. The addition of the water is in this case carried out via a dilution tank 15. Later emptying occurs into the cold salt tank 11.

During the daytime phase, the bypass 12 is not opened. The energy from the sun heats the water-free salt medium in the salt tanks 5 and 11 by the mirror geometries 1 and generates steam via the heat exchanger unit 7, which generates electricity by steam circuit 7→8/9→10. When the sun goes down or in the event of maintenance work, the bypass 12 is opened and liquid, gaseous or sprayed water is introduced via the water reservoir 5 and the pump 14 into the dilution tank 15. This forms a low-melting salt mixture which is, for example during nighttime operation, circulated in a decoupled manner via 1→12→15. Since a reduced flow velocity can be desirable, a (circulation) pump 16 is employed within the decoupled circuit. To avoid (over-) pressure peaks during the introduction of water into 15, an over-pressure valve 17 can be employed for depressurization.

Energy generation is effected, decoupled by bypass 12, via emptying of the thermal reservoir 5 via heat exchanger unit 7 into the cold salt tank 11. When the sun comes up, the water-containing heat transfer medium is pumped into the cold tank, whereupon rapid vaporization of the water occurs. This tank is at the beginning of the day filled with salt melt which has a sufficient residual temperature to dewater the water-containing heat transfer medium.

To avoid pressure conditions in tanks 11 and 15, an over-pressure valve 17 can be employed. Bypass 12 is closed for this purpose. The vaporized water is condensed by the vapor-phase condenser (coupled with a vapor separator) 4 and stored in the water tank 3 for the next feed cycle. Storage tank 15 can be filled with salt melt and/or water-diluted salt melt.

Figure 4:
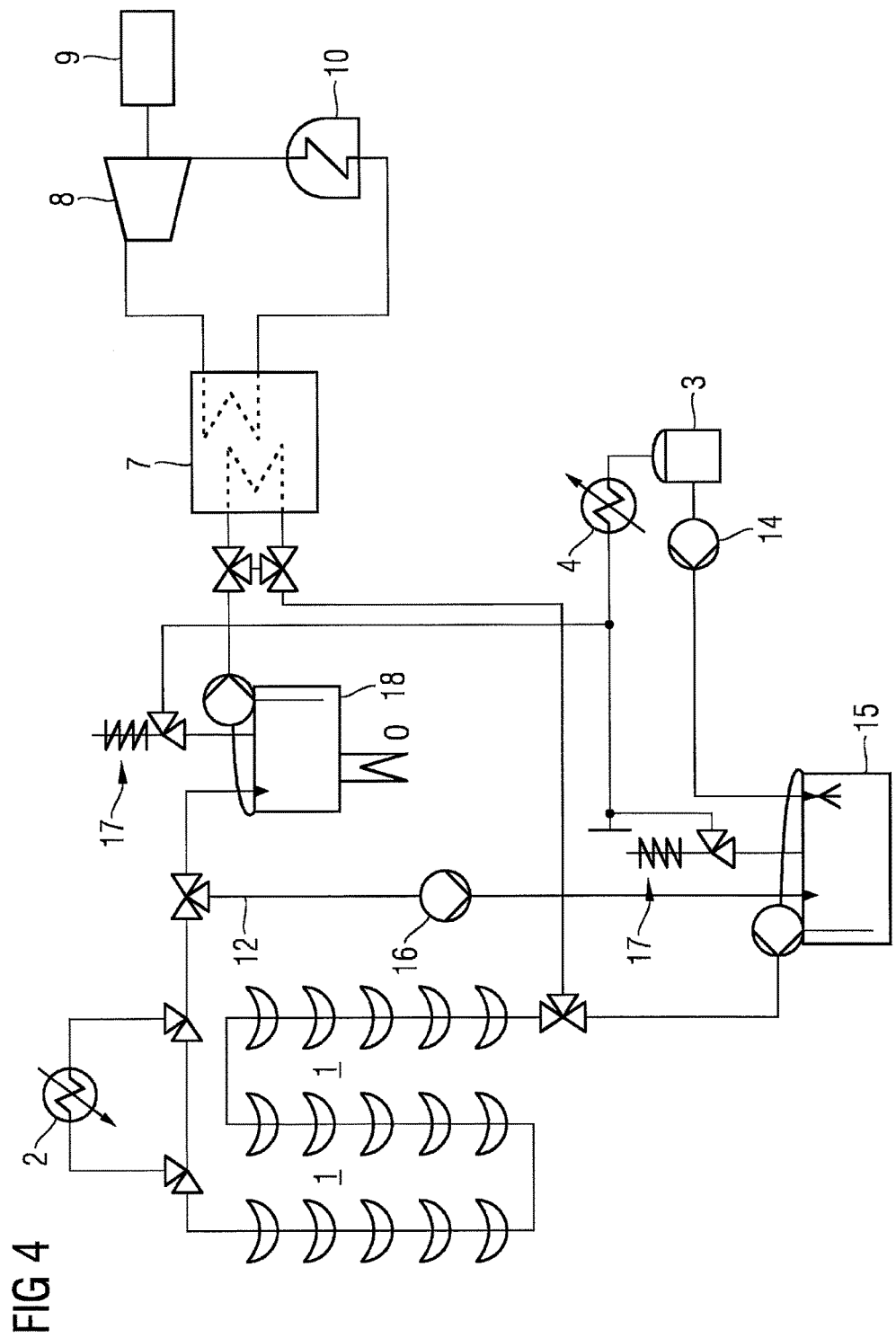

Finally, FIG. 4 shows an example in which the solar thermal plant is operated without salt storage tanks. The introduction of the water is once again effected by a dilution tank 15, and dewatering is then effected via a stripping tank 18.

During the daytime phase, the bypass 12 is not opened. The energy from the sun heats the water-free salt medium via the mirror geometries of the solar field 1 and generates steam via heat exchanger unit 7, which generates electricity via steam circuit 7→8/9→10.

When the sun goes down or during maintenance work, the bypass 12 is opened and liquid, gaseous or sprayed water is continuously introduced via the water reservoir 3 and the pump 14 into the dilution tank 15. This forms a low-melting salt mixture which is, for example during nighttime operation, circulated in a decoupled manner via 1→12→15. Since a reduced flow velocity can be desirable, a (circulation) pump 16 is employed within the decoupled circuit. To avoid (over-)pressure peaks during introduction of water into 15, an over-pressure valve 17 for depressurization can be employed. When the sun comes up, the water-containing heat transfer medium is pumped into the stripping tank 18. This is brought to or maintained at temperature by additional firing unit 19 operated in any way (e.g. gas, coal, oil, electricity) in order to dewater the water-containing medium fed in. For this purpose, stripping tank 18 can be initially filled with dewatered, hot salt medium in order to ensure continuous replacement of the medium in 1. For this purpose, it can be advantageous for the steam generation via 7 to be temporarily bypassed until 1 has been completely replaced.

For the first time there is a possible way of operating a solar thermal plant economically. The novel method presented here makes it possible both to use a cheap heat transfer fluid (HTF) and either to completely save or significantly reduce the energy-consuming supplementary heating overnight. For this purpose, a water tank is simply installed in the plant, without presenting a threat to the environment, and dilution of the salt is effected by addition of water from this tank when solar heating is not operational.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A solar thermal power station using a water-free or water-containing salt as a heat transfer fluid (HTF), comprising:
   a first circuit containing the HTF;
   a second circuit containing steam to drive generators; and
   a heat exchanger connecting the first and second circuits,
   where the first circuit comprises:
      a solar field comprising mirror geometries and conduits in which the HTF flows;
      a first conduit for heated HTF which leads from the solar field to the heat exchanger;
      a heated HTF reservoir arranged along the first conduit;
      a second conduit for cooled HTF which leads from the heat exchanger to the solar field;
      a cooled HTF reservoir arranged along the second conduit;
      a third conduit for introducing a diluent to the HTF;
      a plurality of pumps including a first pump coupled to the heated HTF reservoir or the cooled HTF reservoir and configured to pump the HTF and diluent into the heated HTF reservoir or cooled HTF reservoir;
      a plurality of flow valves; and
      wherein the plurality of flow valves and pumps are controllable to operate the solar thermal power station in the following modes:
         an energy generation mode in which the flow valves are controlled to pass a flow of HTF through the solar field, the first conduit, the heated HTF reservoir, the heat exchanger, the second conduit, the cooled HTF reservoir, and back into the solar field; and a decoupled mode in which the flow valves are controlled to (a) route the HTF through a decoupled circuit that passes through the solar field but is decoupled from the heat exchanger such that the HTF routed through the decoupled circuit bypasses the heat exchanger, and (b) couple the third conduit to the decoupled circuit to supply diluent to the HTF in the decoupled circuit, the diluent reducing a melting point of the HTF; and wherein during a transition from the decoupled mode to the energy generation mode, the flow valves and the first pump are controlled to pump the HTF and diluent into the heated HTF reservoir or cooled HTF reservoir to rapidly depressurize the HTF and diluent to vaporize and separate the diluent from the HTF.

2. The power station as claimed in claim 1, wherein water is used as the diluent.

3. The power station as claimed in claim 1, wherein the conduits, pumps, and/or cooled and heated HTF reservoirs are made of stainless steel.

4. The power station as claimed in claim 3, wherein the conduits, pumps, and/or cooled and heated HTF reservoirs are made of high carbon stainless steel.

5. The power station as claimed in claim 1, wherein inner surfaces of the conduits, pumps, and/or cooled and heated HTF tanks reservoirs are treated with a corrosion-inhibiting coating.

6. The power station as claimed in claim 1, wherein the HTF is a water-containing or water-free salt having one or more cations selected from the group consisting of alkali metal cations and alkaline earth metal cations, and
the HTF has one or more anions selected from the group consisting of nitrates, (hydrogen)carbonates, fluorides, chlorides, (hydrogen)sulfates, bromides, iodides and hydroxides.

7. The power station as claimed in claim 1, wherein an over-pressure valve and/or a vapor separator with an associated vapor condenser are provided on at least one of the cooled HTF reservoir or the heated HTF reservoir.

8. The power station as claimed in claim 1, wherein the heated HTF reservoir comprises a hot salt HTF tank,
the first conduit leads from the solar field to the heat exchanger via the hot salt HTF tank,
the hot salt HTF tank has an over-pressure valve, a vapor separator and an associated vapor condenser, and
the vapor separator removes the diluent from the hot salt HTF tank.

9. The power station as claimed in claim 1, wherein the diluent is water,
the HTF is water-free when driving the generators, and
the HTF is water-containing overnight.

10. A method of operating a solar thermal power station, comprising:
operating the solar thermal power station in an energy generation mode during a day time period, including:
heating a salt heat transfer fluid (HTF) using mirrors in a solar field, to thereby produce hot HTF;
transferring the hot HTF to a heat exchanger;
removing heat from the hot HTF in the heat exchanger to produce a cold HTF and to generate electricity;
transferring cold HTF from the heat exchanger to the solar field;
operating the solar thermal power station in a decoupled mode during a reduced solar energy period in which the temperature of the HTF decreases, including:
adding a diluent to the HTF to thereby reduce a melting point of the HTF and to maintain the HTF at a temperature above the melting point of the HTF;
decoupling the solar field from the heat exchanger, such that the HTF does not run from the solar field to the heat exchanger; and
transitioning the solar thermal power station from the decoupled mode to the energy generation mode, including delivering the HTF and diluent to a vaporization tank and rapidly depressurizing the HTF and diluent, causing rapid vaporization of the diluent.

11. The method as claimed in claim 10, wherein the diluent is added continuously when the temperature of the HTF decreases by dropwise addition, spraying in, introduction of mist and/or introduction of a jet.

12. The method as claimed in claim 10, wherein the solar field is decoupled from the heat exchanger overnight or during maintenance work.

13. The method as claimed in claim 12, wherein for transitioning the solar thermal power station from the decoupled mode to the energy generation mode, the HTF is heated to significantly above the melting point of the HTF before the solar field is re-coupled to the heat exchanger, and after the HTF is heated to significantly above the melting point of the HTF, the HTF is suddenly depressurized in the vaporization tank.

14. The method as claimed in claim 10, wherein the solar field is decoupled from the heat exchanger when the diluent is added.

15. The method as claimed in claim 10, wherein
the diluent is water,
the HTF is water-free when driving the generators, and
the HTF is water-containing overnight.

16. The method of claim 10, wherein, during operation of the solar thermal power station in the energy generation mode, the vaporization tank operates as a thermal reservoir for the hot HTF.

17. The method of claim 16, wherein, operation of the solar thermal power station in the decoupled mode includes pulping heated HTF remaining in the thermal reservoir through the heat exchanger and into a cold HTF reservoir.

* * * * *